United States Patent [19]

Meier-Kaiser

[11] Patent Number: 5,980,098
[45] Date of Patent: Nov. 9, 1999

[54] EXTRUSION SYSTEM AND PROCESS FOR MINIMIZING COLOR CHANGE TIMES IN EXTRUSION OF THERMOPLASTICS

[75] Inventor: Michael Meier-Kaiser, Alsbach-Hähnlein, Germany

[73] Assignee: Roehm GmbH Chemische Fabrik, Darmstadt, Germany

[21] Appl. No.: 08/965,036

[22] Filed: Nov. 5, 1997

[30] Foreign Application Priority Data

Nov. 7, 1996 [DE] Germany .............................. 196 46 394

[51] Int. Cl.⁶ .......................................................... B29B 7/24
[52] U.S. Cl. .......................................................... 366/76.3
[58] Field of Search ................... 366/76.1, 76.3, 366/76.6, 76.92, 76.93, 79, 91, 182.4, 156.1, 156.2, 158.2, 181.4; 264/211.21, 211.23, 78; 425/133.1, 209, 207, 204

[56] References Cited

U.S. PATENT DOCUMENTS

| | | | |
|---|---|---|---|
| 3,868,093 | 2/1975 | Sokolow | 366/76.6 |
| 4,557,683 | 12/1985 | Meeker et al. | 366/78 |
| 4,832,960 | 5/1989 | Campagnon | 425/204 |
| 5,468,586 | 11/1995 | Proper et al. | |
| 5,749,649 | 5/1998 | Schobert-csongor et al. | 366/76.4 |

FOREIGN PATENT DOCUMENTS

| | | |
|---|---|---|
| 37 35 279 | 4/1989 | Germany . |
| 682 647 | 10/1993 | Switzerland . |
| 2 090 559 | 7/1982 | United Kingdom . |
| 2 216 844 | 10/1989 | United Kingdom . |

OTHER PUBLICATIONS

Patent Abstracts of Japan, vol. 17, No. 623 (M–1511), Nov. 17, 1993, JP 05 192982, Aug. 3, 1993.
Patent Abstracts of Japan, vol. 17, No. 53 (M–1361), Feb. 3, 1993, JP 04 265728, Sep. 21, 1992.
Patent Abstracts of Japan, vol. 17, No. 8 (M–1350), Jan. 7, 1993, JP 04 239623, Aug. 27, 1992.

*Primary Examiner*—Tony G. Soohoo
*Attorney, Agent, or Firm*—Oblon, Spivak, McClelland, Maier & Neustadt, P.C.

[57] ABSTRACT

An extrusion system includes a main extruder and a secondary injection extruder. Both extruders are connected via a three-way valve. The main extruder has a mixing section downstream of the junction point with the secondary injection extruder. An accelerated switch between molding masses with different colors can be made by switching the three way valve.

20 Claims, 2 Drawing Sheets

EXTRUSION SYSTEM AND PROCESS FOR MINIMIZING COLOR CHANGE TIMES IN EXTRUSION OF THERMOPLASTICS

BACKGROUND OF THE INVENTION

1. Field of the Invention

The invention relates to an extrusion system and a process for minimizing color change times in the extrusion of thermoplastics.

2. Description of the Related Art

The usual procedure in the manufacture of colored extrudates is to supply the extruder with a mixture of a non-pigmented base molding mass and a master batch which contains the pigment in high concentration. Mixing can take place both off-line in batches in a separate mixer, or in-line by parallel metering of the two components into the extruder hopper.

In case of a color change, generally no further master batch is metered in until the color has been washed out of the system. If necessary, a cylinder cleaning agent such as a molding mass with high viscosity can also be passed through for cleaning. Afterwards, a master batch with a different color is used. The color change has been completed once the new extrudate uniformly exhibits the new color. The extrudate produced during the color change generally cannot be sold.

SUMMARY OF THE INVENTION

It is an object of the present invention to provide an apparatus and a process which make it possible to shorten the color change times in the extrusion of colored plastics.

The above and other objects are achieved according to the invention by an extrusion system including a main extruder and a secondary injection extruder, wherein both extruders are connected via a three-way valve. The main extruder has a mixing section downstream of the junction point with the secondary injection extruder.

The extrusion system according to the invention produces faster color changes than conventional systems in which only one extruder is used. While the entire volume of the extruder must be cleaned of the colored plastic melt in a conventional system, this is necessary only starting from the mixing section of the main extruder in the extrusion system according to the invention, since the non-colored melt and the colored melt do not come together until this point. This means that a comparatively smaller volume must be cleaned and, of course, this can be done in a shorter period of time time. In addition, the secondary injection extruder must be cleaned.

The secondary injection extruder has a relatively small volume in comparison with the main extruder, so that the melt which is colored in a concentrated manner can be effectively discharged in a short period of time. Cleaning of the main extruder and the secondary injection extruder takes place at the same time, which again shortens the overall cleaning time.

The three-way valve allows coupling or uncoupling of the main extruder and the secondary injection extruder. In one position of the three-way valve, both the valve and the flow path between it and the junction point can be cleaned.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
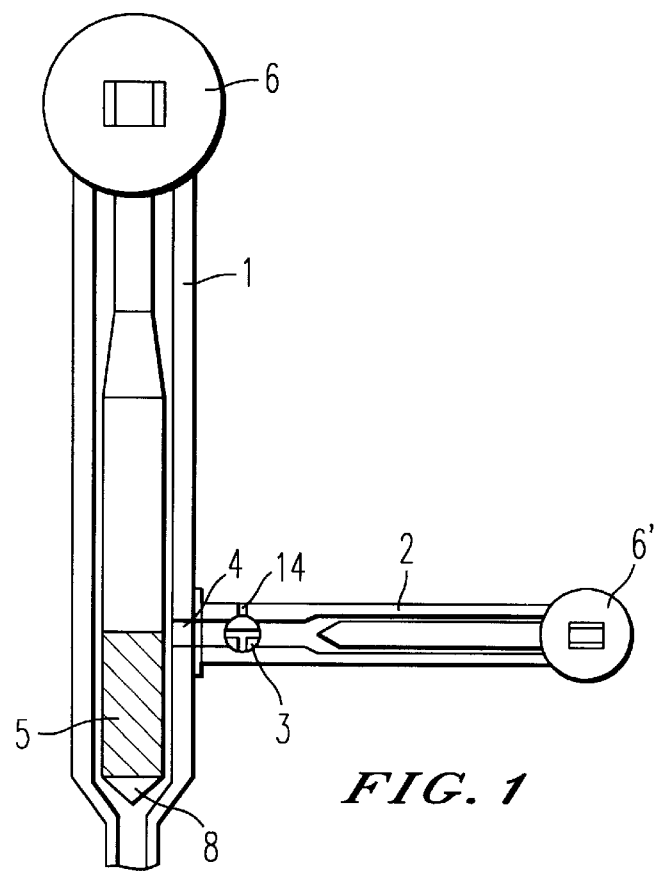
FIG. 1 shows the extrusion system according to the invention in a top view.

A non-limiting example of an extrusion system according to the invention includes a main extruder (1) and a secondary injection extruder (2). The main extruder has an extruder barrel fed with molding mass granulate by a hopper (6), and a rotatable extruder screw which feeds the material fed from the hopper (6) to a mixing section (5). A flow channel (7) is located beyond the downstream tip (8) of the mixing section (5). An opening in the wall of the extruder barrel forms a junction point (4) with a flow path between the main extruder (1) and the secondary injection extruder (2). The junction point (4) is located at a downstream region of the main extruder (1), preferably downstream by at least two thirds, to three quarters, of the length of the main extruder (1), and just upstream of the mixing section (5).

The secondary injection extruder (2) has an extruder barrel fed with molding mass granulate by a hopper (6'), and a rotatable screw shaft which feeds the material fed from the hopper (6') toward the junction point (4) via a three-way valve (3) located in the flow path therebetween. The secondary injection extruder (2) has a smaller volume than the main extruder (1), preferably a volume smaller by a factor of 3–10.

Figure 2A:
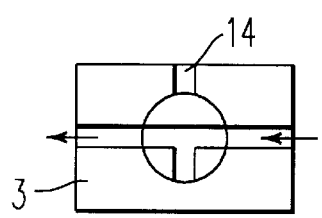
FIGS. 2A, 2B and 2C respectively shows the three-way valve in different positions.
Figure 2B:
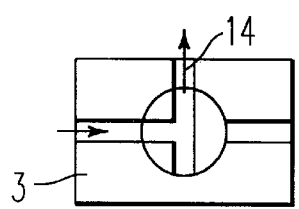
Figure 2C:
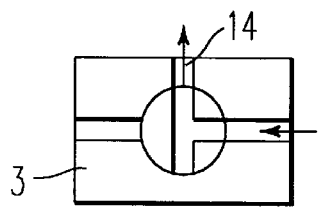

The three-way valve (3) has a valve housing with a melt exit (14), and a rotatable valve body. FIGS. 2A, 2B and 2C respectively show the valve body of the three-way valve in the three alternate positions thereof. The arrows stand for the flow direction of the melt. In the first position shown in FIG. 2A, the three-way valve (3) creates a connection for the flow path between the main extruder (1) and the secondary injection extruder (2). In the second position shown in FIG. 2B, the secondary injection extruder (2) is blocked and the melt can exit from the main extruder (1) through the melt exit (14) of the three-way valve (3). In the third position shown in FIG. 2C, the main extruder (1) is blocked and the melt can exit from the secondary injection extruder (2) through the melt exit (14) of the three-way valve (3).

In the main extruder (1), the non-colored base molding mass B is fed via the hopper (6) and melted (melt B). The master batch molding mass M, which contains concentrated pigment, is introduced into the secondary injection extruder (2) via the hopper (6'), melted (melt M) and metered into the main extruder (1) through the three-way valve (3) which is in position (I). Both melts are mixed in the mixing section (5), which is located downstream of the junction point (4). As a rule, a molding die, e.g., a broad slit die, is arranged at the outlet of the flow channel (7) of the main extruder (1), and the colored melt exits from it, e.g., in the form of a plastic web for sheets or films.

A process for an accelerated switch between molding masses with different colors in the extrusion system according to the invention may be performed in such a way that after extrusion of a first colored molding mass F1, produced from a basic molding mass B which is passed through the main extruder (1) and is not colored, and a master batch molding mass M1 containing concentrated pigment which is added via the secondary injection extruder (2) when the three-way valve (3) is in the first position of FIG. 2A, the non-colored base molding mass B is passed through the main extruder (1) and the secondary injection extruder (2), one after the other, with the three-way valve (3) the position shown in FIGS. 2B and 2C, respectively, causing the master batch molding mass M1 to be cleaned from the flow path between the main extruder and the three-way valve (3), from the secondary injection extruder (2), and from the three-way valve (3). Subsequently, extrusion of a molding mass F2 with a different color, produced from a basic molding mass B which is passed through the main extruder (1) and is not colored, and another master batch molding mass M2 containing concentrated pigment which is added via the secondary injection extruder (2) when the three-way valve (3) is in position (I), can be started.

The master batch molding masses M1 and M2 are generally of different colors. They are mixed into the non-colored basic molding mass B to achieve the desired coloring of the molding masses F1 and F2, respectively, which are then extruded.

When a color change is made, the procedure can be as follows. The secondary injection extruder (2) is stopped. The three-way valve (3) is brought into the position shown in FIG. 2B. The colorless melt B from the main extruder (1) flows through the junction point (4) to the three-way valve (3) and through the three-way valve (3) itself until no coloring of the melt exiting from the melt exit (14) is seen. The melt exiting from the three-way valve (3) can be collected in a container, for example. The main extruder (1) simultaneously also cleans itself in that the colorless melt B removes the residues of the colored molding mass from the mixing section (5) through the flow channel (7) and any extrusion die that might be present.

The three-way valve is now brought into the position shown in FIG. 2C and the colored melt M is cleaned from the secondary injection extruder (2). This preferably occurs by feeding base molding mass B into hopper (6') until the melt exiting from the melt exit (14) of the three-way valve (3) no longer exhibits any coloring. Then a new, differently colored, master molding batch M' is passed through the secondary injection extruder (2) when the melt B discharged through the melt exit (14) shows no evidence of the first color.

The three-way valve (3) is now brought back into position (I) and extrusion of the differently colored plastic produced from base molding mass B and a new master batch molding mass M' can be started.

Figure 3:
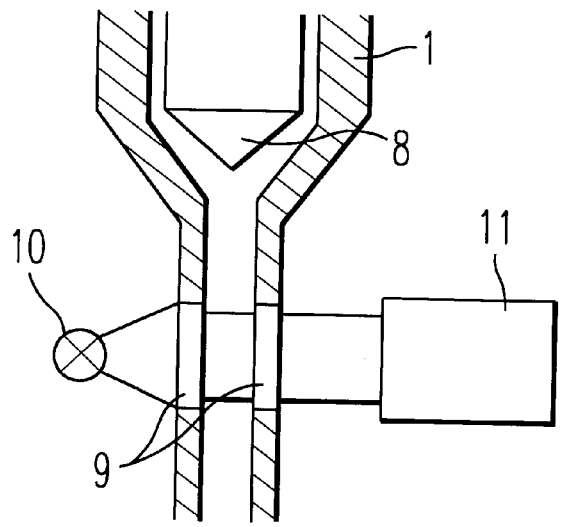
FIG. 3 is a partial lengthwise cross-section through the main extruder with an in-line color measuring device in the flow channel.

In another embodiment (see FIGS. 3 and 4), the main extruder (1) is provided with opposed glass inserts (9) defining the flow channel (7) downstream of the screw tip (8) to permit in-line color measurement. The glass inserts may be provided in a contact pressure frame (12) and sealed by sealing elements (13). A light source (10) is affixed on one side, and a sensor (11) to register the color, i.e., the intensity of the coloring, is affixed on the other side. A suitable conventional measurement device, e.g., a spectral photometer or three-range measurement device, may be used as the sensor (11).

On the basis of the actual values obtained during the in-line color measurement, the amount of melt M added from the secondary injection extruder (2), for example, can be regulated so as to reduce or eliminate any deviation from predetermined reference values, preferably by regulating the screw speed in the secondary injection extruder (2), so that the coloring can be kept constant within narrow limits.

Figure 4:
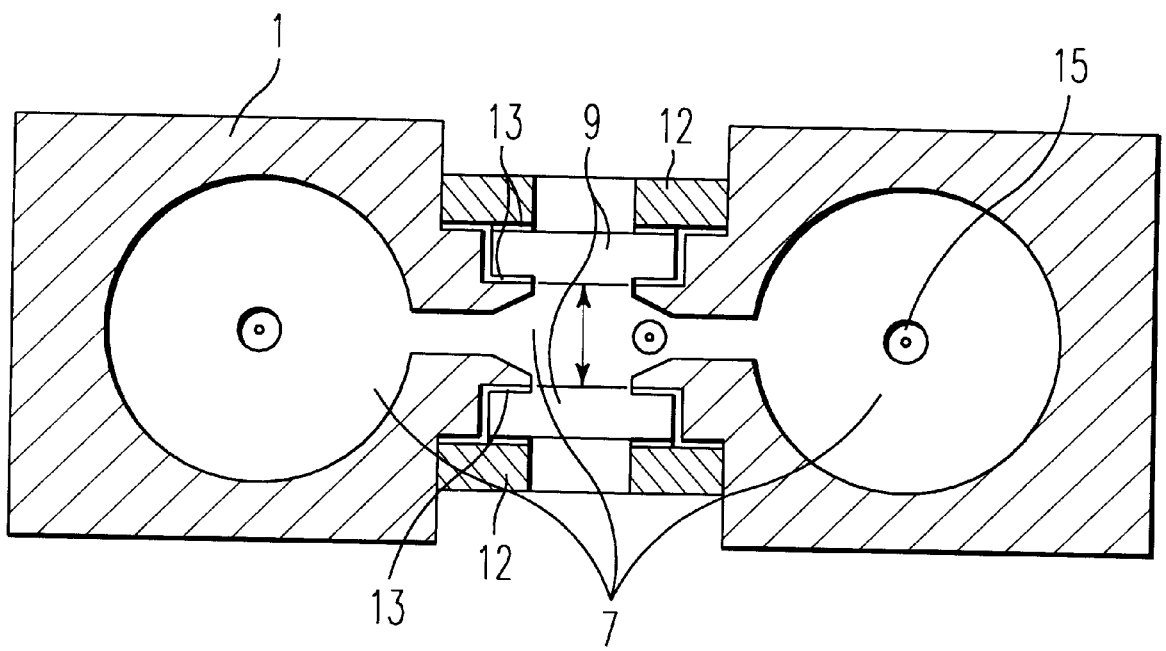
FIG. 4 is a cross-section through an embodiment in which two main flow channels feed a narrowed flow channel having an in-line color measuring device.

In order to reduce the thickness of the melt layer to be measured, if necessary, the flow channel (7) can also be narrowed at the measurement site, where the main part of the melt flows through pipe-like channels. FIG. 4 is a cross-section through an embodiment in which two main flow channels feed a narrowed flow channel having an in-line color measuring device. The thickness of the measurement segment between the glass inserts (9) is symbolized by the double arrow in FIG. 4. This makes it possible or easier to measure very intense colors and provides several advantages, including a short measurement segment, low pressure loss and good self-cleaning.

When measuring the color of the melt, it must be taken into consideration that the pigments usually used for coloring plastics can have a temperature-dependent color. However, corresponding correction factors can be determined by taking color measurements at different temperatures.

In-line color measurement and control of the amount of melt M added also make it possible to reuse material which was partly and non-uniformly colored and collected when the extruders were flushed out. This can be done by first grinding the material and then adding it to the non-colored base molding mass in the hopper (6) of the main extruder (1) in gradually increasing amounts. The amount added is limited such that the color is kept within the predetermined tolerances.

Obviously, numerous modifications and variations of the present invention are possible in light of the above teachings. It is therefore to be understood that the invention may be practiced otherwise than as specifically described herein.

I claim:

1. An extrusion system comprising:
   a main extruder through which a melt material can flow to a mixing section;
   a secondary injection extruder connected to the main extruder at a junction point upstream of the mixing section to form a melt material flow path between the main extruder and the secondary injection extruder; and
   a three-way valve in the flow path, said three way valve being positionable in at least a first position opening the flow path between said main extruder and the secondary injection extruder, and at least one other position blocking the flow path between said main extruder and the secondary injection extruder.

2. The extrusion system according to claim 1, wherein the at least one other position includes a second position in which melt material from the main extruder is discharged through an exit via the three-way valve and a third position in which melt material from the secondary injection extruder is discharged through an exit via the three-way valve.

3. The extrusion system according to claim 2, wherein the secondary injection extruder has a volume 3–10 times smaller than the main extruder.

4. The extrusion system according to claim 2 including an in-line color measurement device.

5. The extrusion system according to claim 4, wherein the in-line color measurement device is positioned at a narrowed point of a flow channel downstream of the mixing section.

6. The extrusion system according to claim 2, which comprises an in-line color measurement device.

7. The extrusion system according to claim 6, wherein the in-line color measurement device is positioned at a narrowed point of a flow channel downstream of the mixing section.

8. The extrusion system according to claim 1, wherein the secondary injection extruder has a volume 3–10 times smaller than the main extruder.

9. The extrusion system according to claim 1 including an in-line color measurement device.

10. The extrusion system according to claim 9, wherein the in-line color measurement device is positioned at a narrowed point of a flow channel downstream of the mixing section.

11. A process for keeping constant the coloring of a mixed melt produced in an extrusion system including a main extruder through which a melt material can flow to a mixing section, a secondary injection extruder connected to the main extruder at a junction point upstream of the mixing section to form a melt material flow path between the main extruder and the secondary injection extruder, a three-way valve positioned in the flow path, said three way valve being positionable in at least a first position opening the flow between said main extruder and secondary injection extruder, and at at least one other position blocking the flow path between said main extruder and the secondary injection extruder and an in-line color measurement device, comprising the steps of:

producing a non-colored melt in the main extruder;

producing a colored melt containing concentrated pigments in the secondary injection extruder;

mixing the non-colored melt and the colored melt to produce a mixed melt;

determining an actual value of the color of the mixed melt using the in-line color measurement device; and altering at least one parameter of at least one of said steps of producing the noncolored melt and producing the colored melt in response to the determined actual value so as to cause the actual value of the color of the mixed melt to approach a reference value of the color of the mixed melt.

12. The process according to claim 11 wherein said step of altering at least one parameter of at least one of said steps of producing the noncolored melt and producing the colored melt comprises altering the flow rate of the colored melt so as to substantially eliminate any deviation of the actual value of the color of the mixed melt from the reference value.

13. A process for performing an accelerated switch between molding masses with different colors in an extrusion system including a main extruder through which a melt material can flow to a mixing section, a secondary injection extruder connected to the main extruder at a junction point upstream of the mixing section to form a melt material flow path between the main extruder and the secondary injection extruder and a three-way valve in the flow path, said three way valve being positionable in a first position opening the flow path between said main extruder and the secondary injection extruder, a second position blocking the flow path between said main extruder and the secondary injection extruder and permitting the melt material to be discharged from the main extruder through an exit via the three-way valve, and a third position blocking the flow path between said main extruder and the secondary injection extruder and permitting the melt material to be discharged from the secondary injection extruder through an exit via the three-way valve, comprising the steps of:

producing a first colored molding mass by mixing a non-colored base molding mass in the main extruder and a master batch molding mass containing concentrated pigments in the secondary injection extruder while the three-way valve is in the first position;

cleaning the master batch molding mass from the flow path between the main extruder and the three-way valve, from the secondary injection extruder, and from the threeway valve by moving the three-way valve to at least one of the second and third positions and passing the non-colored base molding mass through at least one of the main extruder and the secondary injection extruder; and moving the three-way valve to the first position and producing a second colored molding mass by mixing the non-colored base molding mass B in the main extruder and another master batch molding mass containing concentrated pigments in the secondary injection extruder.

14. The process according to claim 13 wherein said cleaning step comprises sequentially moving the three-way valve to the second position and passing the non-colored base molding mass through both the main extruder and the secondary injection extruder, and moving the three-way valve to the third position and passing the non-colored base molding mass through both the main extruder and the secondary injection extruder.

15. An extrusion system, comprising:

a main extruder through which a melt material is flowable to a mixing section;

a secondary injection extruder connected to the main extruder at a junction point upstream of the mixing section to form a melt material flow path between the main extruder and the secondary injection extruder; and a three-way valve located in the flow path, said three-way valve being positionable in a first position opening the flow path between said main extruder and the secondary injection extruder, a second position blocking the flow path between said main extruder and the secondary injection extruder and permitting the melt material to be discharged from the main extruder through an exit via the three-way valve, and a third position blocking the flow path between said main extruder and the secondary injection so as to permit the melt material to be discharged from the secondary injection extruder through the exit via the three-way valve.

16. The extrusion system according to claim 15, wherein the secondary injection extruder has a volume which is smaller than that of the main extruder.

17. The extrusion system according to claim 16, wherein the secondary injection extruder has a volume 3–10 times smaller than the main extruder.

18. The extrusion system according to claim 15, wherein the secondary injection extruder has a volume 3–10 times smaller than the main extruder.

19. The extrusion system according to claim 15, including a in-line color measurement device.

20. The extrusion system according to claim 19, wherein the in-line color measurement device is positioned at a narrowed point of a flow channel downstream of the mixing section.

* * * * *